United States Patent
Baumberg et al.

(10) Patent No.: US 8,743,452 B2
(45) Date of Patent: Jun. 3, 2014

(54) COLOUR CHANGE MATERIAL AND METHOD OF MANUFACTURE THEREOF

(75) Inventors: Jeremy John Baumberg, Cambridge (GB); Phillip Nigel Bartlett, Alresford (GB); Sumeet Mahajan, Cambridge (GB); Robin Cole, London (GB)

(73) Assignee: Cambridge Enterprise Limited of the Old Schools, Cambridge (GB)

( * ) Notice: Subject to any disclaimer, the term of this patent is extended or adjusted under 35 U.S.C. 154(b) by 887 days.

(21) Appl. No.: 12/601,335

(22) PCT Filed: May 22, 2008

(86) PCT No.: PCT/GB2008/001751
§ 371 (c)(1),
(2), (4) Date: May 24, 2010

(87) PCT Pub. No.: WO2008/142417
PCT Pub. Date: Nov. 27, 2008

(65) Prior Publication Data
US 2010/0245978 A1  Sep. 30, 2010

(30) Foreign Application Priority Data
May 23, 2007  (GB) .................................. 0709846.0

(51) Int. Cl.
*G02F 1/29* (2006.01)
(52) U.S. Cl.
USPC .......................................................... 359/318
(58) Field of Classification Search
USPC ......... 359/290, 291, 292, 245, 308, 318, 900; 428/304.4; 425/385; 264/293
See application file for complete search history.

(56) References Cited

U.S. PATENT DOCUMENTS

| | | | |
|---|---|---|---|
| 6,995,916 B2* | 2/2006 | Yamanaka et al. | 359/619 |
| 2006/0118721 A1* | 6/2006 | Antoszewski et al. | 250/338.4 |
| 2008/0212102 A1* | 9/2008 | Nuzzo et al. | 356/445 |

OTHER PUBLICATIONS

International Search Report and Written Opinion for corresponding application No. PCT/GB2008/001751 mailed on Oct. 16, 2009.
Coyle et al.; "Confined Plasmons in Metallic Nanocavities," Physical Review Letters APS USA, vol. 87, No. 17; Oct. 22, 2001; pp. 176801/1-176801/4, XP002494565.
Prakash et al.; "Tumble Resonant Optical Microcavities by Self-Assembled Templating" Optics Letters Opt. Soc. America USA vol. 29, No. 13; Jul. 1, 2004; pp. 1500-1502, XP002494564.
Pursiainen Otto et al.; "Compact Strain-Sensitive Flexible Photonic Crystals For Sensors," Applied Physics Letters, AIP American Institute of Physics; vol. 87, No. 10; Aug. 30, 2005; pp. 101902-101902, XP012075561.

* cited by examiner

*Primary Examiner* — Tuyen Tra
(74) *Attorney, Agent, or Firm* — Renner, Otto, Boisselle & Sklar, LLP

(57) ABSTRACT

Metal nanovoids are grown on a stretchable plastic film. The fabrication proceeds by assembling the template of a single layer of close packed silica spheres on a conducting substrate. A conducting layer is then electrochemically grown on top to form a master. An elastomeric precursor is then coated on the master (e.g. by spinning) and is cured before removal. The resulting plastic film is then coated with a thin (e.g. 20 nm) layer of noble metal (e.g. Au, Ag or Cu), to produce a flexible film. Applications for such tuneable structural color would be coating of injection molded artifacts, such as mobile phone covers, car bodies to form an iridescent skin, wall and fascia decorations, loudspeaker coatings, architectural tent coverings, and clothing.

10 Claims, 2 Drawing Sheets

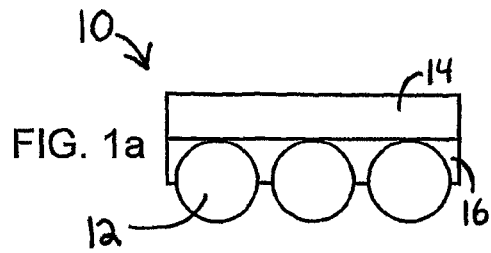
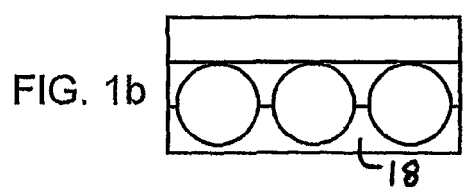
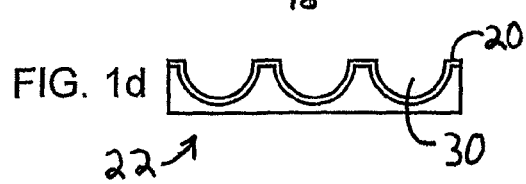
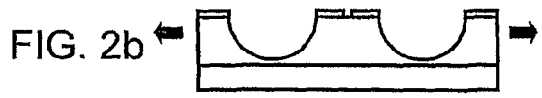
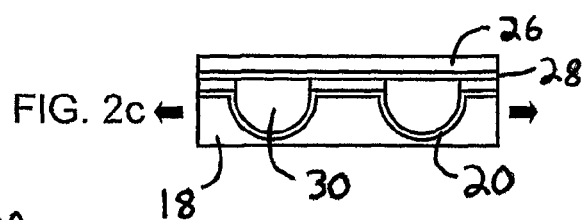
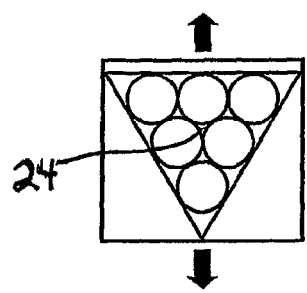
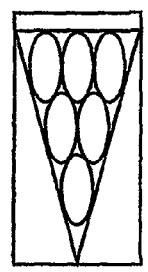
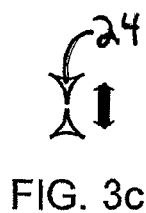
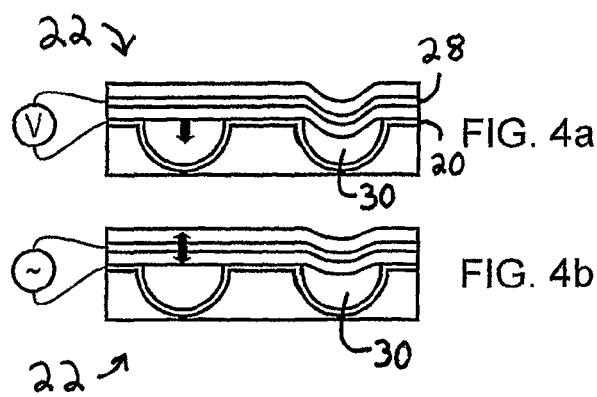
FIG. 5

COLOUR CHANGE MATERIAL AND METHOD OF MANUFACTURE THEREOF

This application is a national phase of International Application No. PCT/GB2008/001751 filed May 22, 2008 and published in the English language.

FIELD OF THE INVENTION

The invention relates to a colour change material, a device or article composed of colour change material, a method of manufacturing a colour change material, and to a master for use in a method of manufacturing a colour change material.

BACKGROUND TO THE INVENTION

For 5 years, we have been exploring the use of self-assembly and templating to create metal nanostructures which have strong structural colour resonances [1]. These depend on light trapped near the surface of 3D sculpted noble metals on size scales from 100 nm to 10 μm. We have also been developing self-assembled plastic photonic crystals for structural colour applications.[2] Also, we have been developing spherical microcavities like these to demonstrate resonant trapping of specific colours of light [3].

The present invention combines these three ideas together to make metal structures embedded in elastic films, whose colour changes when stretched.

SUMMARY OF THE INVENTION

The invention relates in one aspect to a colour change material comprising a stretchable substrate having an assembly of voids shaped and dimensioned to reflect or absorb light of particular colours.

The voids may be coated with a metallic film. The voids and their metallic film coatings preferably support localised surface plasmons. A membrane layer is advantageously provided with a reflective coating that forms a photon or plasmon resonator with the metallic film enclosing the voids. The assembly of voids has a thickness of less than 10 or 20 μm in examples of the invention. The material can be deployed to give colour effects dependant on the degree of stretching or deformation by any external stimulus (e.g. pressure, magnetic, electrical or optical fields), for example as a surface covering of an object.

The invention further relates to a device composed of the colour change material specified above having a membrane layer, the device further comprising a voltage source connected to the material to modulate the photon or plasmon resonator by deformation of the substrate and/or the membrane layer.

The invention also relates to a method of manufacturing a colour change material, comprising: provide a master having a surface bearing an inverse void structure for forming an assembly of voids shaped and dimensioned to reflect or absorb light of particular colours; applying the master to a stretchable substrate or liquid precursor thereof; and separating the master from the stretchable substrate.

Additionally, the method may further comprise coating the voids with a metallic film, and optionally also adding a membrane layer with a reflective coating to enclose the voids and form a photon or plasmon resonator with the metallic film.

The invention also relates to a master for use in the method of manufacturing specified above.

BRIEF DESCRIPTION OF THE DRAWINGS

FIG. 1a shows the master used for fabricating the flexible film which comprises the template of a single layer of close packed silica glass spheres arranged on a glass substrate, wherein a conducting metal substrate is formed by a metal layer which buries the lower halves of the glass spheres, leaving hemispheres of the glass spheres standing proud of the metal layer.

FIG. 1b shows an elastomeric precursor layer coated on the master illustrated in FIG. 1a FIG. 1c shows the plastic film resulting from FIG. 1b.

FIG. 1d shows a flexible film made by coating the plastic film of FIG. 1c with a thin layer of noble metal.

FIG. 2a shows a variant by which the metal film is only provided on the top layer, leaving an array of encapsulated metal triangles which nearly touch.

FIG. 2b shows the device of FIG. 2a after stretching in the direction of the arrows, showing how the separation can be controlled by the strain, thus changing colour.

FIG. 2c shows a further variant having an additional flat top film with a noble metal coating.

FIG. 3a illustrates in plan view an array of encapsulated metal triangles which nearly touch.

FIG. 3b illustrates in plan view a uniaxially stretched version of FIG. 3a.

FIG. 3c illustrates adjacent metal triangles in plan view.

FIG. 4a shows the structure of FIG. 2c in which the metal layers coating the nanovoids and adjacent the top film are connected to a voltage source for forcing the films to attract and repel each other responsive to the applied voltage.

FIG. 4b is similar to FIG. 4a, but shows an AC voltage source for applying a pressure wave to the device.

FIG. 5 shows a colour strip of structural colour resonances producible with material according to the invention.

DETAILED DESCRIPTION OF THE INVENTION

Figure 6A:
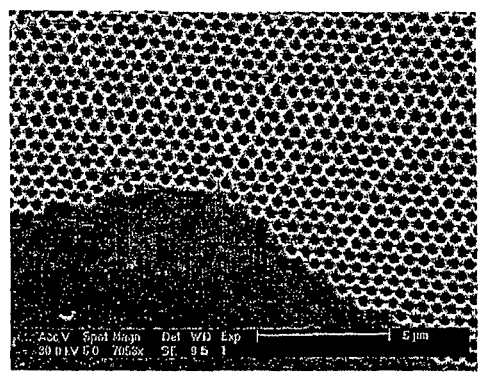
FIG. 6a is a scanning electron micrograph of an example film as illustrated in FIG. 1d, wherein the metal is gold and the nanovoids have a diameter of 900 nm.

For 5 years, we have been exploring the use of self-assembly and templating to create metal nanostructures which have strong structural colour resonances (FIG. 5).[1] These depend on light trapped near the surface of 3D sculpted noble metals on size scales from 100 nm to 10 μm. We have also been developing self-assembled plastic photonic crystals for structural colour applications.[2] Also, we have been developing spherical microcavities like these to demonstrate resonant trapping of specific colours of light.[3] This patent brings these three ideas together to make metal structures embedded in elastic films, whose colour changes when stretched.

The basic concept is shown in FIG. 1. Metal nanovoids are grown on a stretchable plastic film. The fabrication proceeds slightly differently to previous work. We assemble first the template of a single layer of close packed silica spheres 12 on a conducting substrate 14 (FIG. 1a). We then electrochemically grow a conducting layer 16 on top of this to form a master 10. An elastomeric precursor 18 is then coated on this master 10 (e.g. by spinning) and it is cured before removal (FIG. 1b). The resulting plastic film 18 is then coated with a thin (e.g. 20 nm) layer 20 of noble metal (e.g. Au, Ag or Cu), to produce a flexible film 22 (FIG. 1d). This can then be further coated for protection.

Electromagnetic fields in the form of plasmon exist on such surfaces. In the 3D structured films, these produce strong optical resonances [1]. The resonance are sensitive to the size and shape of the nanostructures. Hence by using a thin layer of a ductile metal inside elastomers, the optical resonances can be tuned by stretching the film 22. A variant might have the metal on just the top layer, leaving for instance an array of encapsulated metal triangles 24 which nearly touch, and whose separation is controlled by the strain, thus changing their colour (FIG. 2b, FIG. 3). If these are made to electrically contact with no strain, and then separate as strain is applied, their colour could change from silver to red (a metal—insulator transition).

Simple applications for such tuneable structural colour would be coating of injection moulded artefacts, such as mobile phone covers. The iridescent appearance would be further highlighted by colour changes wherever the film has been stretched. Similarly car bodies could be coated with swirling patterns of iridescent skin.

The next simple application would be in the form of flexible films whose colour changes with stretching, such as wall and facia decoration, loudspeaker coatings, architectural tent coverings. Another realisation might be as part of clothing, with the wearer's movement changing the strain, and hence the local colour.

Further developments might be the addition of a flat top film 26 (FIG. 2c), with also a noble metal coating 28 (possibly inside). On its own, this will have enhanced structural colour from the trapping of light between the films. By passing opposite voltages to the upper 28 and lower 20 metal films, they can be forced to attract and repel, changing the colour as a result (FIG. 4a). By applying a pressure wave using this mechanism, for instance by applying a weak ac voltage which is tuned to the mechanical (drum) resonances of the cavities 30, the average position of the top film 26 is changed, hence leading to colour changes (FIG. 4b). The advantage of such mechanical resonant driving is the lower drive voltages required. The structure can be optimised to provide strongest time-averaged changes in shape when driven at high frequencies. By changing slightly the resonance frequency of the cavities 30 at different positions across a film (for instance by grading the thickness of the top layer), then different regions can be driven into resonance at different ac drive frequencies. By modulating the drive frequencies different parts of the film could show wavering colour changes to a viewer.

FIG. 5 shows a colour strip of structural colour resonances producible with material according to the invention.

Sensors:

All of the above effects could be used as optical based sensors, for instance of pressure, temperature, electrical fields and frequencies. Possibly by the loading-induced change in frequencies of mechanical vibrations, they can be used to sense attached layers (e.g. molecules, thickness sensors).

A further refined use a sensor is in surface-enhanced Raman scattering (SERS). Our prior art uses metal nanovoids as a substrate which supports plasmons that act as antennae to feed light into molecules efficiently. This increases the SERS signal of molecules close to the metal surface by a factor of million to billion-fold, allowing sensitive molecular identification. One difficulty is that each nano-structured substrate has to be tuned to the source laser and molecule used. By having a nano-substrate (e.g. FIG. 2a), the SERS can be optimised in real time to provide the largest signal for the molecule vibration under current study, or it can be scanned.

Other geometries for the thin film architecture could also be envisaged; with possible improvements in optical resonance for a given strain. For instance, an array of holes in a thin metal film sandwiched between elastomers. Optical resonance could also be read out through crossed-polarisers, so very sensitive to induced birefringence.

The advantages of the invention include: low cost, mass producible, wide range of markets, thin film, integratable into standard plastics process, and can be made very sensitive to strain.

EXAMPLE

FIG. 6a is a scanning electron micrograph of an example film as illustrated in FIG. 1d, wherein the metal is gold and the nanovoids have a diameter of 900 nm.

Figure 6B:
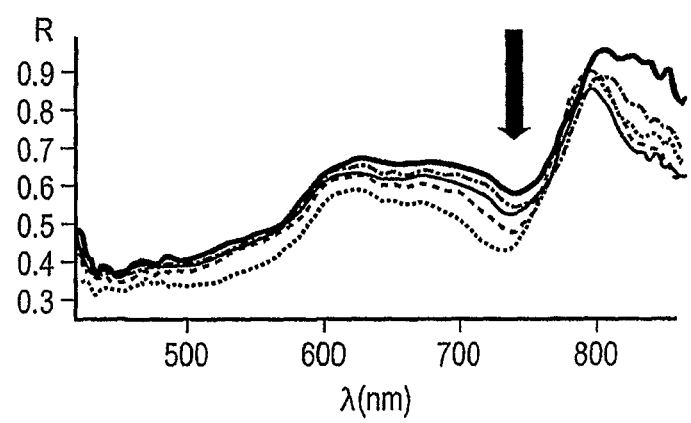
FIG. 6b shows reflectivity R of the film of FIG. 6a as a function of wavelength λ in nm as the film is stretched from unstrained (0%) to 3% strain.

FIG. 6b shows reflectivity R of the film of FIG. 6a as a function of wavelength λ in nm as the film is stretched from 0% to 3% uniaxial strain by stretching. The downward arrow at around 730 nm illustrates the principal plasmon mode. At 700 nm, the lowermost trace is 0%, with progressively increasing strain for each of the five traces, with the uppermost trace being 3%.

Figure 6C:
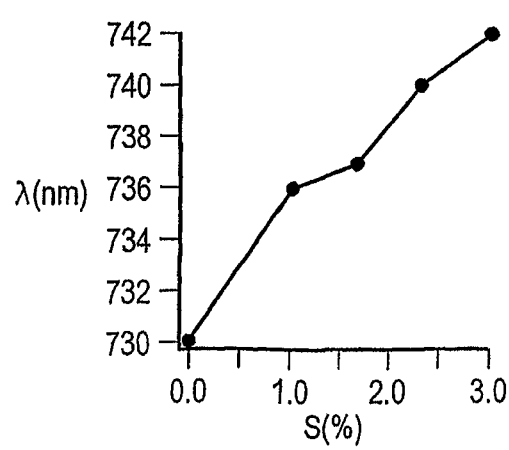
FIG. 6c shows the shift of the main plasmon mode wavelength λ in nm with strain S in percent.

FIG. 6c shows the shift of the main plasmon mode wavelength λ in nm with strain S in percent, thereby illustrating how the mode wavelength tunes with stretch.

These could be also used for higher technology applications, such as tuneable filters in lasers, light emitting diodes, fibre-based communications systems etc. Also in controllable micro-optics devices, such as modulators, array focussing, and printing.

REFERENCES

[1] "Confined Plasmons in Metallic Nanocavities", S. Coyle, M. C. Netti, J. J. Baumberg, M. A Ghanem, P. R. Birkin, P. N. Bartlett, D. M. Whittaker, Phys. Rev. Lett. 87, 176801 (2001)
[2] "Compact Strain-Sensitive Flexible Photonic Crystals for Sensors", Otto L. J. Pursiainen, Jeremy J. Baumberg, Kevin Ryan, Holger Winkler, Benjamin Viel and Tilmann Ruhl, Appl. Phys. Lett. 87, 101902 (2005)
[3] "Tunable Resonant Optical MicroCavities by Templated Self-Assembly", G V Prakash, L Besombes, J J Baumberg, M Abdelsalam, P N Bartlett, Opt. Lett. 29, 1500 (2004).

The invention claimed is:

1. A colour change material comprising a stretchable elastomeric substrate having an assembly of voids coated with a metalic film, the voids being shaped and dimensioned to reflect or absorb light of particular colours and to show a colour change when stretched.

2. The material of claim 1, wherein the voids and their metallic film coatings support localised surface plasmons.

3. The material of claim 1, wherein the assembly of voids has a thickness of less than 20 μm.

4. The material of claim 1, wherein the assembly of voids has a thickness of less than 10 μm.

5. A colour change material comprising a stretchable elastomeric substrate having an assembly of voids coated with a metalic film, the voids being shaped and dimensioned to reflect or absorb light of particular colours and to show a colour change when stretched, and a membrane layer with a reflective coating that forms a photon or plasmon resonator with the metallic film enclosing the voids.

6. A method comprising:
providing a colour change material comprising a stretchable substrate having an assembly of voids shaped and dimensioned to reflect or absorb light of particular colours; and deploying the colour change material to give colour effects dependent on the degree of stretching or deformation by any external stimulus.

7. The method of claim 6, wherein the material is deployed as a surface covering of an object.

8. A device comprising:
   a stretchable elastomeric substrate having an assembly of voids coated with a metallic film, and the voids being shaped and dimensioned to reflect or absorb light of particular colours and to show a colour change when stretched;
   a membrane layer with a reflective coating that forms a photon or plasmon resonator with the metallic film enclosing the voids; and
   a voltage source connected to modulate the photon or plasmon resonator by deformation of the substrate and/or the membrane layer.

9. A method of manufacturing a colour change material, comprising:
   providing a master having a surface bearing an inverse void structure for forming an assembly of voids shaped and dimensioned to reflect or absorb light of particular colours;
   applying the master to a stretchable elastomeric substrate or liquid precursor thereof;
   separating the master from the stretchable elastomeric substrate;
   coating the voids with a metalic film.

10. The method of claim 9, further comprising adding a membrane layer with a reflective coating to enclose the voids and form a photon or plasmon resonator with the metallic film.

* * * * *